United States Patent

[11] 3,621,393

[72] Inventor Louis W. Pignolet
 Chatham, N.J.
[21] Appl. No. 831,263
[22] Filed May 29, 1969
[45] Patented Nov. 16, 1971
[73] Assignee Weston Instruments, Inc.
 Newark, N.J.
 Continuation of application Ser. No.
 517,233, Dec. 29, 1965, now abandoned.

[54] COMPACT MOVING COIL METER MOVEMENT
 3 Claims, 4 Drawing Figs.
[52] U.S. Cl. .................................................. 324/150,
 324/151 R
[51] Int. Cl. ...................................................... G01r 1/16,
 G01r 1/20
[50] Field of Search .......................................... 324/150,
 151; 335/222

[56] References Cited
UNITED STATES PATENTS
| | | | |
|---|---|---|---|
| 835,755 | 11/1906 | Holden | 324/150 |
| 2,840,782 | 6/1958 | Ammon | 324/150 |
| 2,980,857 | 4/1961 | Langford | 324/150 |

FOREIGN PATENTS
| | | | |
|---|---|---|---|
| 1,335,834 | 10/1962 | France | 324/150 |

Primary Examiner—Alfred E. Smith
Attorneys—William R. Sherman, Stewart F. Moore and Jerry M. Presson ABSTRACT: Meter movement having a single U-shaped plate with an arcuate permanent magnet secured to one surface thereof. An inward extension of the plate forms one pivotal support for a moving coil and pointer assembly. The coil surrounds the magnet and the portion of the plate adjacent the magnet and is freely movable transversely of the magnet as the moving coil assembly rotates. The second pivotal support and the remainder of the magnetic circuit is provided by a second plate which is mounted in parallel spaced relationship to the first plate, the magnet being between the two plates. The second plate is spaced from the magnet to allow clearance for one leg of the coil.

INVENTOR.
Louis W. Pignolet

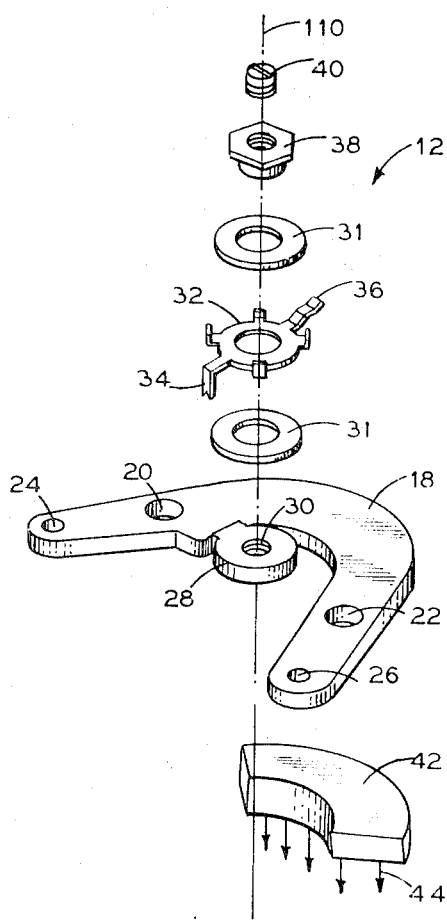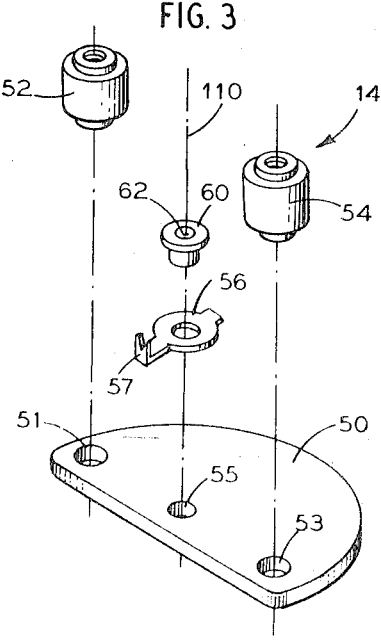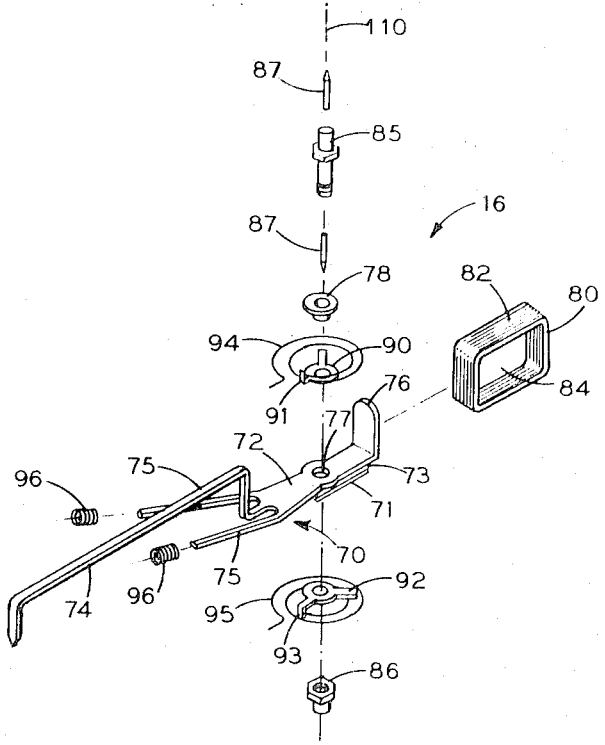

COMPACT MOVING COIL METER MOVEMENT

This is a continuation of application, Ser. No. 517,233, filed Dec. 29, 1965 and now abandoned.

This invention relates to an improved electrical indicating instrument and, in particular, to a compact moving coil meter employing the D'Arsonval principle.

A typical electrical indicating instrument employing the D'Arsonval principle includes a movable coil to which an input signal is applied. The coil is usually connected to a pointer arm and at least one leg of the coil is disposed in an airgap and is subjected to the influence of a magnetic field. The interaction between the magnetic flux produced by the current flowing in the coil and the magnetic field produces a torque which causes the coil and an associated pointer arm to rotate about a pivotal axis. The extent of rotation is indicative of the quantity of electricity being measured and the pointer arm indicates on a suitable scale the coil's angle of rotation.

For a compact indicating instrument, it is very desirable that the axial (along the pivotal axis) dimension be as small as possible. The term "compact" throughout the specification refers to a shallow meter, that is, one having a small axial dimension, generally less than ½inches.

The compact electrical meters presently available have several disadvantages. First of all one compact meter presently available is not adequately shielded in the axial direction, resulting in inadequate shielding with respect to adjacent meters, adjacent mounting panels, or other external objects. Instead, complete shielding can only be accomplished by a special shielding plate which merely adds to the overall thickness of the meter.

Also, another disadvantage of some of the compact meters presently available is that they do not have the magnet positioned immediately adjacent to the air gap. Instead it is positioned at some point distant therefrom, and a soft iron armature is used to carry the flux to and from the airgap. Therefore, in order to have a very uniform density across the airgap, it may be necessary to have a larger airgap than normally needed in order to make up for the difference in reluctance of the airgap as opposed to the soft iron armature on either side of the airgap. Such a configuration also requires more shielding due to leakage of flux, hence an inefficient use of the magnet.

Therefore, it is an object of this invention to provide a new and improved compact electrical indicating instrument.

It is a further object to provide such an instrument which is inherently exceptionally well shielded.

It is another object to provide an improved electrical indicating instrument in which the permanent magnet is directly adjacent to the airgap.

It is a further object to provide an improved indicating instrument in which the movable coil surrounds both the magnet and an additional highly permeable member which supports the magnet and constitutes a portion of the magnetic circuit of the instrument.

Broadly considered, instruments in accordance with the invention employ a flat permanent magnet which is so magnetized that the flat major faces thereof are the pole faces, frame means including a flat highly permeable magnetic frame member and means coupled thereto mechanically and magnetically to support the magnet in a position spaced from and parallel to the flat frame member, the moving system of the instrument being supported by the frame means for pivotal movement about an axis which is parallel to the magnetic axis of the magnet but spaced laterally therefrom. The moving system includes a coil which surrounds the magnet but is free to move relative thereto, the turns of the coil passing through the active airgap between the magnet and the flat frame member. Advantageously, two flat, highly permeable frame members are employed, the two members being parallel and closely spaced, with one flat pole face of the magnet secured to one frame member and the other pole face being spaced from the other frame member to provide the air gap. The magnet advantageously extends arcuately in a plane at right angles to the pivotal axis of the moving system. Since the coil freely surrounds both the magnet and that portion of the magnetic frame member to which the magnet is secured, the frame member is also made arcuate in conformity with the shape of the magnet. Since the magnet, the active airgap and the portion of the coil passing through the airgap are located wholly between the two frame members, good shielding is provided by the frame members themselves without the need for additional shielding members.

With these and other objects in mind, the features and advantages of the present invention will be best understood from the following detailed description when taken in conjunction with the accompanying drawings in which:

FIG. 2 is an exploded view showing greater details of the arrangement of one of the subassemblies of FIG. 1;

FIG. 3 is an exploded view showing in greater detail the arrangement of parts of a second subassembly of FIG. 1; and FIG. 4 is an exploded view showing in greater detail the arrangement of parts of a third subassembly of FIG. 1.

Figure 1:
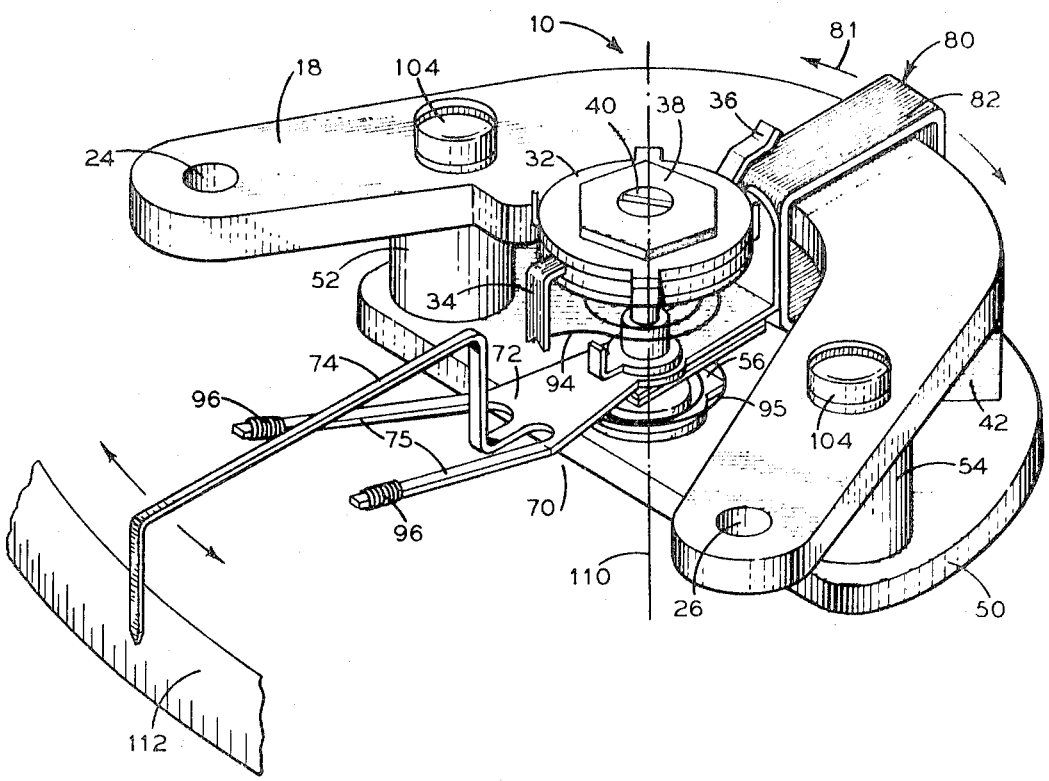
FIG. 1 is a perspective view of a compact instrument made in accordance with a preferred embodiment of this invention.

Referring to the drawings, an assembled compact instrument or meter, generally designated as 10 (FIG. 1), is conveniently disposed in a suitable housing (not shown) and is intended to measure current or voltage. The meter 10 comprises three subassemblies: A top subassembly 12, (FIG. 2) a bottom subassembly 14 (FIG. 3) and a movable coil subassembly 16 (FIG. 4).

Referring to FIG. 2, the top subassembly 12 includes a generally horseshoe-shaped flat plate 18 which is made of a material having a high magnetic permeability, such as soft iron. Four symmetrically disposed holes 20, 22, 24 and 26 are punched through the plate 18. An annular shoulder 28 having a threaded aperture 30 extends inwardly from one leg of the horseshoe-shaped flat plate 18. A jewel-screw assembly 40 is threaded to fit inside the threaded aperture 30 in the shoulder 28. The inside diameters of the insulating washers 31—31 are smaller than the inside diameter of the abutment washer so that the shoulder nut 38 does not come into contact with the abutment washer 32. The abutment washer 32 has two diametrically opposed lugs 34 and 36 thereon. The polar face of a flat permanent magnet 42, having a shape that conforms to the U-shaped contour of a portion of plate 18, is cemented to the bottom of plate 18. The magnet 42 can be made from a suitable Alnico material which is magnetized so that the flux is substantially perpendicular to the principal plane of the plate 18 as shown by the arrows 44. While an Alnico magnet is preferred, a flat ceramic magnet of the desired shape can also be used.

Referring to FIG. 3, the bottom plate subassembly 14 includes a semicircular flat plate 50 through which are punched two holes 51 and 53 in which are mounted two cylindrical studs 52 and 54. The flat plate 50 and the cylindrical studs 52 and 54 are made of a material having a high magnetic permeability, such as soft iron, similar to the material of the flat plate 18. A third hole 55 is punched in the flat plate 50 halfway between holes 51 and 53. A shouldered hub 60, having a central recessed jewel-bearing surface 62 is mounted in the hole 55 so as to hold an abutment washer 56 having a lug 57 against the flat plate 50. Cylindrical studs 52, 54 and hub 60 are mounted in flat plate 50 in any well-known manner, such as press fitting or staking.

Referring to FIG. 4, the subassembly 16 includes a pointer arm, generally designated as 70, having a flat portion 72, a needle portion 74, a right angle support portion 76, and two projections 75—75. A coil 80 of fine wire 82 is mounted on the right angle support portion 76. The coil 80 preferably has a square or rectangular central opening 84 defining an area such that the coil 80 surrounds or circumscribes the combination of plate 18 and the magnet 42 and can freely move thereabout in an arcuate path, as shown by the arrows 81—81 in FIG. 1.

A metal plate 71 is attached to the underside of the flat portion 72 of the pointer arm 70 but is insulated therefrom by a piece of polyester 73. The flat portion 72 has an aperture 77 therein, designed to receive the lower portion of a pivot base 85. The pivot base 85 is securely held to the pointer arm 70 by way of a retaining nut 86. Mounted within both ends of the pivot base 85 are pivot staffs 87—87. The pivot base 85 and retaining nut 86 hold in position an abutment washer 90 against the top surface of the flat portion 72, an abutment washer 92 against the bottom surface of the metal plate 77, and an insulating bushing 78. The insulating bushing 78 insulates the pivot base 85 from the rest of the subassembly. The abutment washers 90 and 92 each have a lug 91 and 93, respectively, thereon. One end of a top coil spring 94 is connected to the lug 91. Similarly, one end of a bottom coil spring 95 is connected to the lug 93. These springs, 94 and 95, are used to conduct current to the coil 80 and also provide a restoring torque to the pointer arm, as is well known to those skilled in the art. Spiral weights 96—96 are positioned on the projections 75—75 in order to balance the subassembly 16.

When the subassemblies are fitted together, the coil 80 is positioned around the plate 18 and magnet 42 and the pivot staffs 87—87 fit into the bearing surface 62 of the shouldered hub 60 and the bearing surface of a jewel-screw assembly 40, allowing the coil 80 to freely move in an arcuate path about the curved portion of the plate 18 and magnet 42 (as shown by the arrows 81—81 in FIG. 1) with the axis of rotation 110 (see FIG. 1) being perpendicular to the principal plane of pointer arm 70. The upper portion of the studs 52 and 54 are placed in the openings 20 and 22, respectively, of plate 18. Two screws 104 (see FIG. 1) hold the studs 52 and 54 in said openings. Holes 24 and 26 in plate 18 are mounting holes used for connecting the assembly to a suitable housing. Also, the free end of the top coil spring 94 is connected to the lug 34 of abutment washer 32 and the free end of the bottom coil spring 95 is connected to the lug 57 of abutment washer 56. Cooperating with and adjacently disposed to the needle 74, is a scale 112 for providing a measure of the electrical energy applied to the coil 80. In some applications, such as a flat front-of-panel meter design, the needle 74 may have a straight tip rather than the bent tip shown in FIG. 1.

The input electrical signal to be measured by the deflection of the movable coil subassembly 16 is connected to the coil 80 as follows:

One input terminal is connected to lug 36 of abutment washer 32. The other input terminal is connected to any suitable electrically conductive part of either the top subassembly 12 or the bottom subassembly 14. One end of the coil wire 82 is electrically connected to the right angle support portion 76 of the pointer arm 70 and the other end of the coil wire 82 is connected to the metal plate 71 on the underside of the pointer arm 70. With these connections and the three subassemblies assembled as described above, the current will flow from one input terminal through the abutment washer 32, through the top coil spring 94, through the abutment washer 90, through the pointer arm 70, through the coil 80, through the flat metal plate 71, through the abutment washer 92, through the lower coil spring 95, and through the abutment washer 56 to the other input terminal.

In operation, when an input electrical signal is applied to the coil 80, the movable coil subassembly 16 will pivot about the axis 110 due to the torque produced by the interaction between the magnetic flux produced by current flowing in the coil 80 and the magnetic flux across the airgap between the magnet 42 and the lower flat plate 50. This single airgap, which must be accurate, is advantageous as compared to a double airgap, since it is easier and cheaper to manufacture. Also, the axial dimension of the meter can be minimized with one airgap as compared to two airgaps.

It is important to note that the magnet 42 is contained between the two plates 18 and 50 in the axial direction, hence minimizing any flux leakage in that direction. This makes possible the stacking of a plurality of meters in the axial direction without the use of independent shielding plates, hence contributing to a greater overall shallowness.

Finally, the positioning of the magnet immediately adjacent to the airgap insures uniform flux density in the entire airgap with a simple design. This is because the dimensions of the magnet and airgap are of constant throughout the coil deflection angle. In other words, the reluctance of any path from the magnetic flux source (the magnet 42) to a point on the coil 80, as the coil passes through the airgap, is constant. This is a highly efficient use of the magnet since it minimizes the volume of the magnet required for satisfactory flux density in the airgap.

While one particularly advantageous embodiment of the invention has been disclosed, it will be obvious to those skilled in the art that various changes and modifications may be made therein without departing from the invention, and it is, therefore, intended to cover all such changes and modifications as fall within the true spirit and scope of the invention as defined in the appended claims.

What is claimed is:

1. A well-shielded thin meter movement comprising the combination of
   a movable assembly comprising
      a pointer,
      a hollow rectangular coil and
      connecting means for supporting the coil and pointer;
   means for supporting said movable assembly at said connecting means for rotational movement about an axis;
   means for delivering current to said coil;
   a permanent magnet in the shape of a segment of a flat annulus, the center of said annulus being at said axis;
   means for confining substantially all of the magnetic field produced by said permanent magnet to within the volume of the instrument and for providing a magnetic circuit for the flux from said magnet, said means comprising
   a U-shaped first plate of magnetically permeable material,
      said first plate having a central portion which has the same curvature as said magnet,
      said central portion having a flat major face lying in a plane perpendicular to said axis,
      said magnet being fixedly mounted on said flat major face,
      said magnet and said central portion of said first plate being disposed within said hollow coil and being dimensioned to allow said coil to pass freely along said magnet and plate during its rotational movement so that said coil is in position to intersect all flux in air from said magnet, including leakage flux;
   a second magnetically permeable plate;
   magnetically permeable means for supporting said second plate in spaced parallel relationship with said flat central portion of said first plate with said magnet and one side of said coil between said first and second plates, and for providing a return flux path between said second and first plates so that the flux in air from said magnet is confined to the gap between said magnet and said second plate.

2. Apparatus according to claim 1 wherein
   said means for supporting said movable assembly includes an extension of said first plate.

3. In a compact electrical meter, the combination of frame means comprising
   two flat members of highly permeable magnetic material, and
   spacer means of highly permeable magnetic material securing said flat members together in parallel, closely spaced relation,
   one of said flat members having an arcuate portion;
      a flat arcuate magnet having one of its flat major faces secured to said arcuate portion of said one flat member,
   said magnet being disposed between said flat members and having its other flat major face spaced from the other of said flat members, said magnet being magnetized at right angles to said flat major faces so that said faces constitute the pole faces of the magnet;

a movable assembly comprising a support, a coil carried by said support, and bearing means carried by said frame means and mounting said support for pivotal movement about an axis extending at right angles to said flat members, said axis being spaced from said magnet and the axis of curvature of said magnet being at least approximately coincident with the axis of pivotal movement of said support, said coil closely but freely surrounding the combination of said magnet and said arcuate portion of said one flat member so that all flux from said magnet, including leakage flux, is available for interaction with current flowing in said coil; and conduction means connected to said coil and via which said coil can be energized, energization of said coil causing said support to pivot as said coil traverses said magnet as a result of interaction between the magnetic flux resulting from current flow in said coil and the magnetic field of said magnet.

* * * * *